(No Model.)

S. L. LOOMIS & A. M. HARRIS.
ANIMAL TRAP.

No. 521,378. Patented June 12, 1894.

Witnesses
E. A. Schumacher
R. K. Ward.

Inventors
Samuel L. Loomis,
Allen M. Harris,
By J. R. Welch
Attorney.

UNITED STATES PATENT OFFICE.

SAMUEL L. LOOMIS, OF SANTA CRUZ, AND ALLEN M. HARRIS, OF WATSONVILLE, CALIFORNIA.

ANIMAL-TRAP.

SPECIFICATION forming part of Letters Patent No. 521,378, dated June 12, 1894.

Application filed April 12, 1893. Serial No. 470,122. (No model.)

*To all whom it may concern:*

Be it known that we, SAMUEL L. LOOMIS, residing at Santa Cruz, and ALLEN M. HARRIS, residing at Watsonville, Santa Cruz county, State of California, citizens of the United States, have invented certain new and useful Improvements in Gopher and Animal Traps; and we do hereby declare that the following is a full, clear, and exact description of the invention, which will enable others who are skilled in the art to which it appertains to use the same.

Our invention relates to gopher and animal traps and it consists of certain novel features hereinafter described and claimed.

Reference is had to the accompanying drawings, wherein the same parts are indicated by the same letters.

Figure 1:
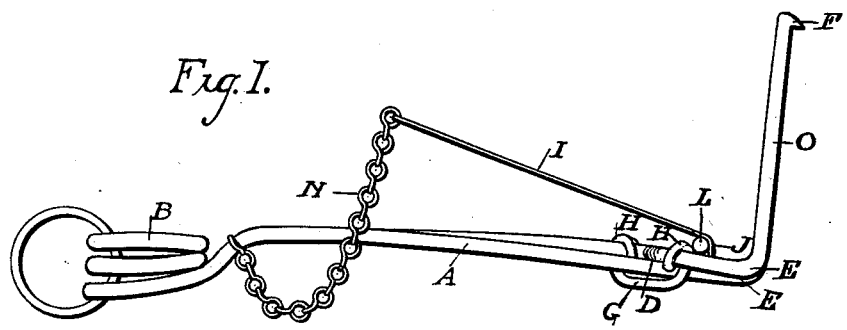
Figure 2:
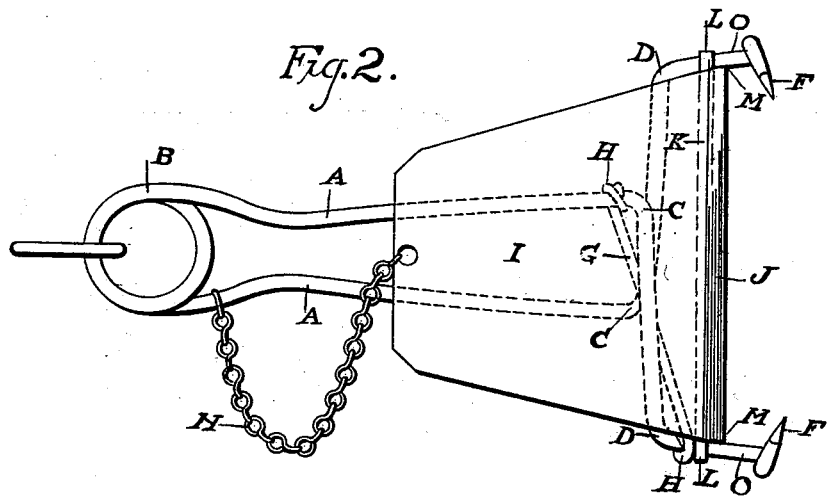
Figure 3:
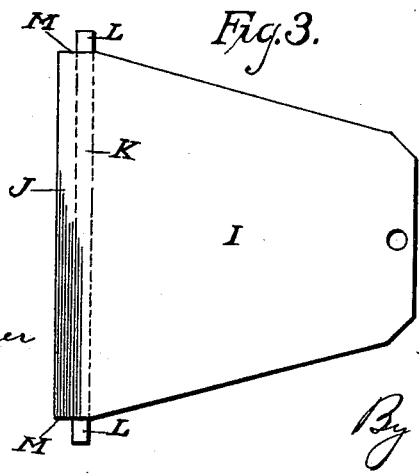

Figure 1 represents a side view of the trap when set. Fig. 2 is a top view of the trigger and trap when set, the dotted lines showing the frame of the trap under the trigger. Fig. 3 represents the trigger, the dotted lines showing the position of the fulcrum rod under the trigger.

The body of the trap consists of a single wire of the desired length and size, with one or more coils forming the spring B, and bent at C and C inwardly in a plane with the coiled spring and crossing to opposite sides; then at D and D and in the same plane, and again at E and E at right angles to the last direction and said plane, forming the upright jaws O and O, each end of the wire terminating in the barbs F and F, as shown in Figs. 1 and 2. The cross wire G attached at H and H is for the purpose of locking and holding the sides A and A and the jaws of the trap in position.

The trigger I consists of a plate of sheet-iron, or other suitable substance, of a convenient shape and size, with one edge J turned down at a convenient angle, thereby forming the lateral shoulders M and M, and of a round wire K soldered or otherwise fastened on the under side in the angle made by said bending of said plate, with two lateral poles L and L. The trap is set by pressing the sides A and A together and placing the lateral shoulders M and M between the opposing sides at points near the angles E and E with the poles resting on the frame of the trap between the points D D and E E, which said poles serve as a rolling fulcrum to disengage the short arm M and M, of the lever-trigger, when the long arm I is pressed upon.

The operation of the device is as follows: The trap is set and is placed entirely in the hole, with the prongs well down in the hole; and the mouth of the hole is then stopped up, the animal coming out of the hole treads with its fore feet on the trigger plate and its weight is sufficient to revolve the part J out of engagement with the arm A and the prongs F impale the body of the animal.

It will be obvious that the trap may be set at the mouth of holes in hollow trees, holes under fences, and the like and may be covered with leaves or left open, and thus it may be used for opossums, rabbits, raccoons, and the like.

Having thus described our invention, what we claim, and desire to obtain by Letters Patent, is—

An animal trap consisting essentially of two parts; first a piece of wire bent into a coil spring as at B and having arms A bent upward as at O and terminating in prongs F, the said arms being normally pressed together by said spring; and second, a trigger plate I bent downward at J and provided with a transverse rod or wire K having projecting arms L forming a fulcrum bar in rolling contact with and adapted to rest on said arms A, to extend the same when the trap is set, substantially as and for the purposes described.

SAMUEL L. LOOMIS.
ALLEN M. HARRIS.

Witnesses:
J. S. SWANK,
H. F. PECKHAM.